United States Patent
Yang

(10) Patent No.: US 8,089,010 B2
(45) Date of Patent: Jan. 3, 2012

(54) ELECTRONIC DEVICE WITH TWO KEYPADS

(75) Inventor: Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 390 days.

(21) Appl. No.: 12/548,443

(22) Filed: Aug. 27, 2009

(65) Prior Publication Data

US 2010/0326808 A1 Dec. 30, 2010

(30) Foreign Application Priority Data

Jun. 30, 2009 (CN) .......................... 2009 1 0303886

(51) Int. Cl.
*H01H 9/26* (2006.01)

(52) U.S. Cl. ..................... 200/5 A; 345/168; 455/575.4; 400/490

(58) Field of Classification Search .................. 200/5 A, 200/5 R; 400/470, 472, 485, 489, 490; 345/156, 345/168, 169, 173, 174; 455/550.1, 566, 455/575.3, 57.45
See application file for complete search history.

(56) References Cited

U.S. PATENT DOCUMENTS

| | | | |
|---|---|---|---|
| 7,120,458 B2 * | 10/2006 | Wendorff et al. | 455/550.1 |
| 7,269,000 B2 * | 9/2007 | Webb et al. | 361/679.27 |
| 7,342,806 B2 * | 3/2008 | Hickey | 361/790 |
| 7,385,150 B1 * | 6/2008 | Siddiqui et al. | 200/5 A |

* cited by examiner

*Primary Examiner* — Xuong Chung Trans
(74) *Attorney, Agent, or Firm* — Altis Law Group, Inc.

(57) ABSTRACT

An electronic device with two keypads is provided. The electronic device includes a recessed portion and a pressable member rotatably attached to the recessed portion. A plurality of key switches is arranged on a surface of the recessed portion. A plurality of first pressable portions are formed on a first surface of the pressable member, and a plurality of second pressable portions are formed on a second surface of the pressable member. The first pressable portions and the key switches form the first keys, and the second portions and the key switches form the second keys. The electronic device further includes a switch unit and a processor. The processor is configured for assigning the key switches to correspond to the first pressable portions or the second portions according to the switch signal generated by the switch unit.

7 Claims, 6 Drawing Sheets

ELECTRONIC DEVICE WITH TWO KEYPADS

BACKGROUND

1. Technical Field

The present disclosure relates to electronic devices and, particularly, to an electronic device with two types of keypads.

2. Description of Related Art

A keypad is usually used to input commands to a portable electronic device, such as a mobile phone, a PDA, and so on. With the development of these electronic devices, more and more functions, such as e-mail, word processing and so on are being added. In order to better process various functions of these electronic devices, particularly, to better process word processing, a keypad similar to a standard computer keypad may be needed. However, when executing some simple functions for example dialing a phone number, only the keys needed for dialing are used, and other keys are not used.

BRIEF DESCRIPTION OF THE DRAWINGS

The components of the drawings are not necessarily drawn to scale, the emphasis instead being placed upon clearly illustrating the principles of the electronic device with two keypads. Moreover, in the drawings, like reference numerals designate corresponding parts throughout several views.

DETAILED DESCRIPTION

Figure 1:
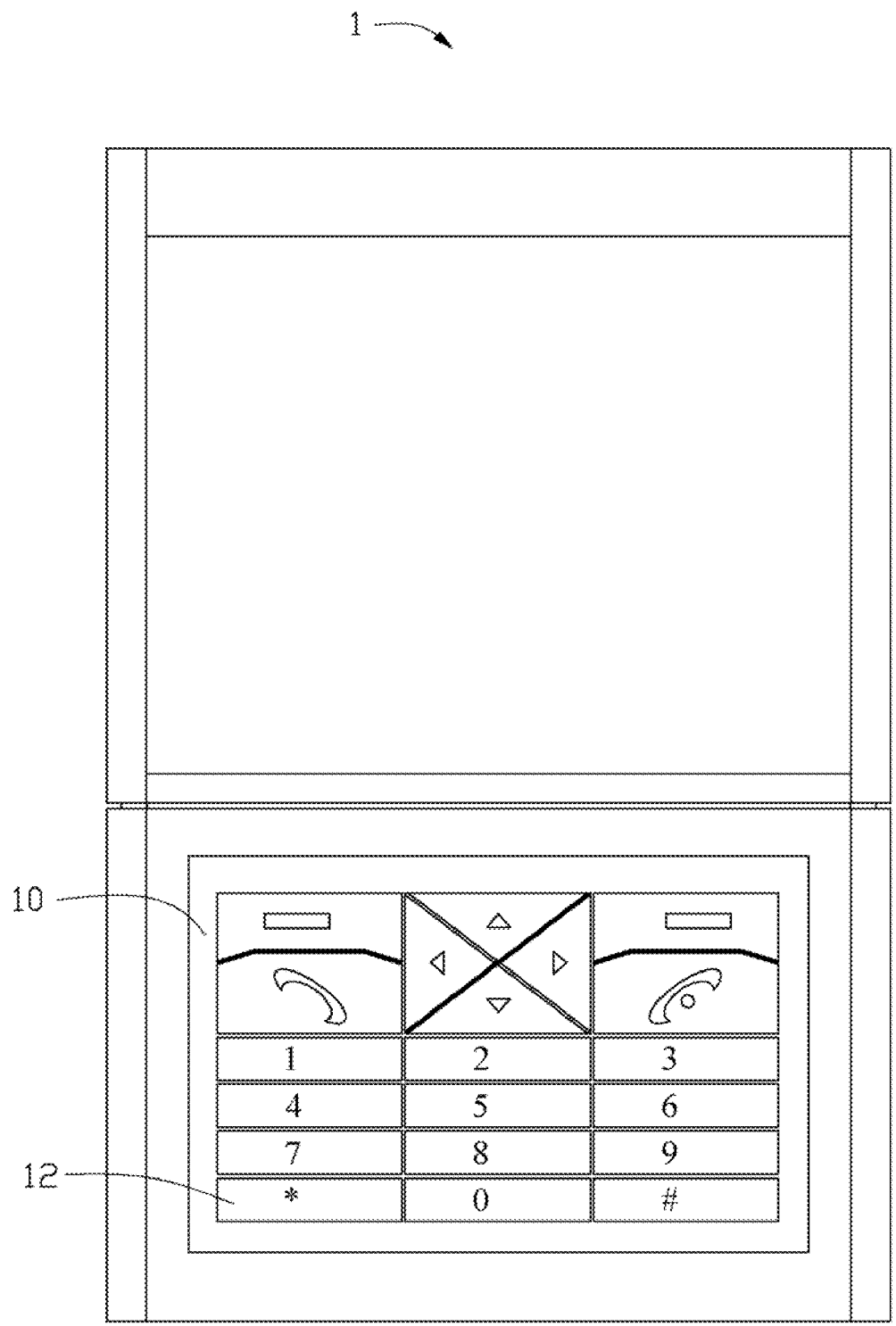
FIG. 1 is a front view of an electronic device showing a first keypad of two keypads in accordance with an exemplary embodiment.
Figure 2:
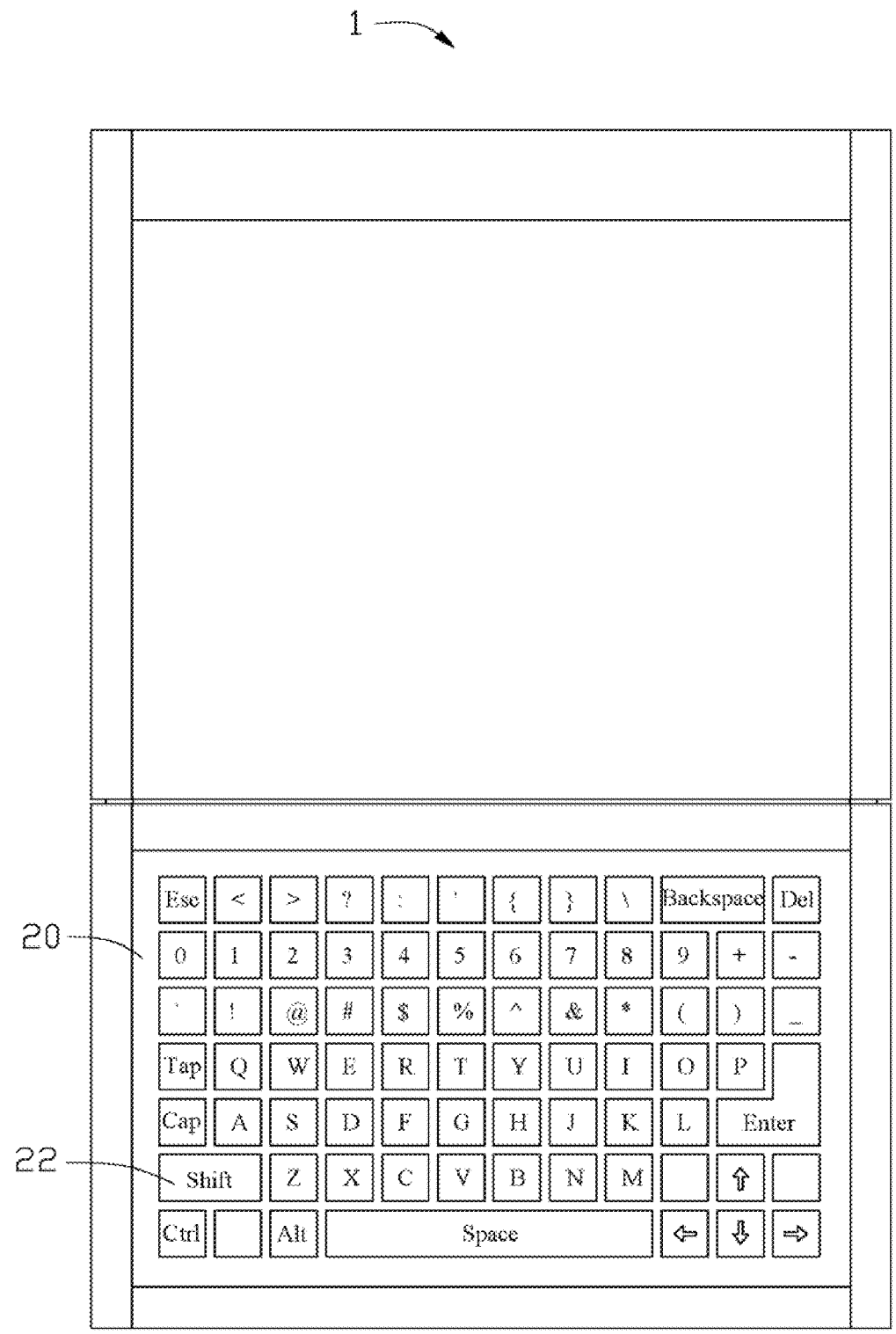
FIG. 2 is a front view of the electronic device of FIG. 1, showing the second keypad.

Referring to FIGS. 1 and 2, an electronic device 1 with two keypads is illustrated. In FIG. 1, a first keypad 10 is shown. In the exemplary embodiment, the first keypad 10 is usually used by users for simple inputs, for example, phone numbers when making a call, and a plurality of first keys 12 are arranged on the first keypad 10. In FIG. 2, a second keypad 20 is shown. In the exemplary embodiment, the second keypad 20 is usually used by users for complex inputs such as during word processing, and a plurality of second keys 22 are arranged on the second keypad 20.

Figure 3:
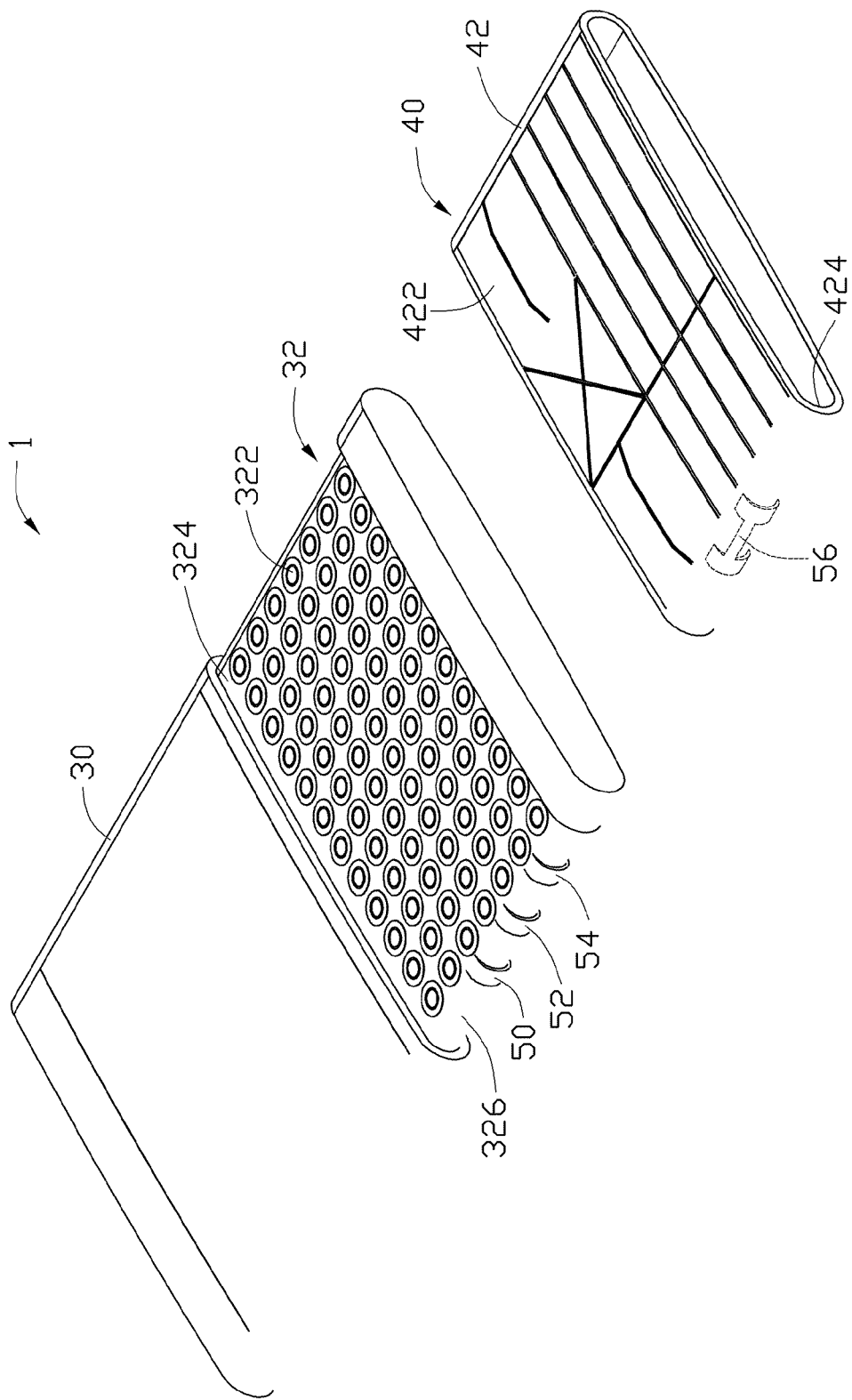
FIG. 3 is an exploded, perspective view of the electronic device of FIG. 1.
Figure 4:
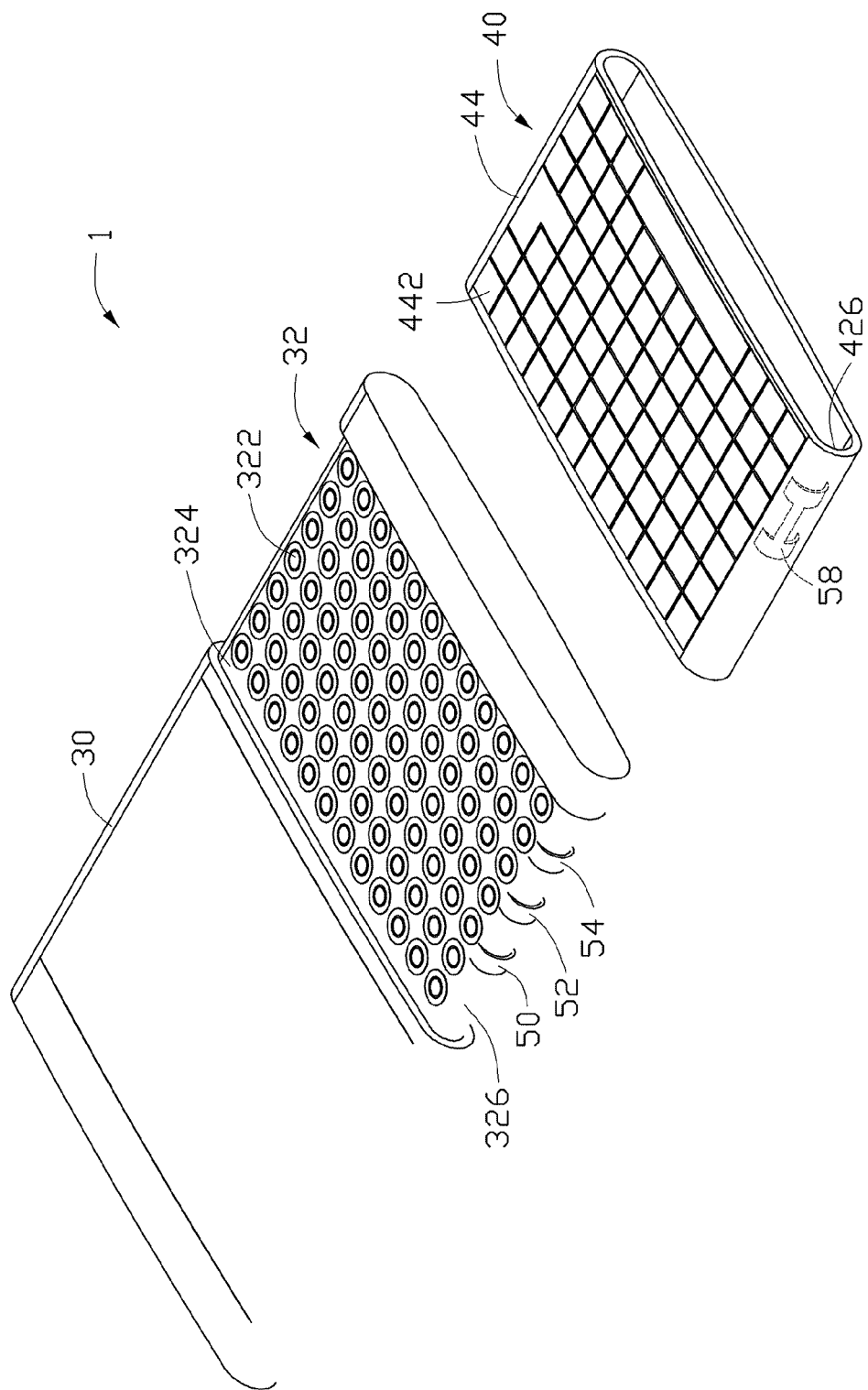
FIG. 4 is an exploded, perspective view of the electronic device of FIG. 1, showing a second keypad of FIG. 2.

Referring also to FIGS. 3 and 4, the electronic device 1 includes a main body 30. A recessed portion 32 is formed on the main body 30. The recessed portion 32 is generally rectangular. A plurality of key switches 322 is arranged on a surface 324 of the recessed portion 32.

The electronic device 1 further includes a hollow pressable member 40. The pressable member 40 is made of soft material, such as pliable plastic. The pressable member 40 is rotatably connected to the recessed portion 32 by placing the pressable member 40 over the recessed portion 32. The pressable member 40 further includes a first surface 42 and a second surface 44. The first surface 42 is opposite to the second surface 44. A plurality of first pressable portions 422 is formed on the first surface 42, and a plurality of second pressable portions 442 is formed on the second surface 44.

The first pressable portions 422 and the switches 322 form the first keys 12, and the second pressable portions 442 and the switches 322 form the second keys 22. In the embodiment, some portions of the first pressable portions 422 and the second pressable portions 442 each correspond to a single switch 322, and some portions to more than one switch 322. For example, the "space" key (see FIG. 2) corresponds to more than one switch 322, therefore if any of the switches 322 corresponding to the "space" key is pressed, the electronic device 1 determines the "space" key is pressed.

Figure 5:
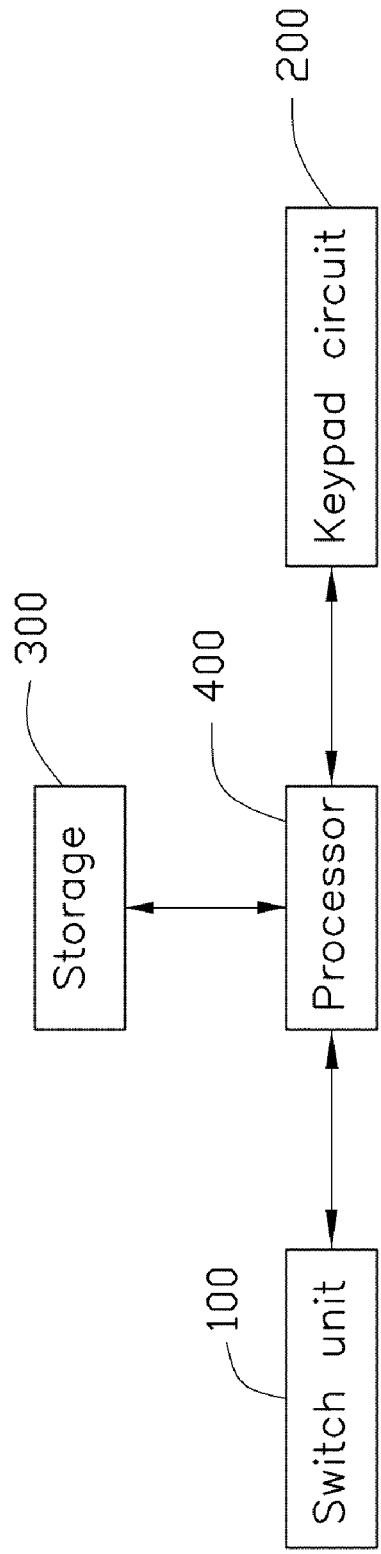
FIG. 5 is a block diagram of the electronic device of FIG. 1.

Referring also to FIG. 5, the electronic device 1 includes a switch unit 100, a keypad circuit 200, a storage 300, and a processor 400.

The switch unit 100 is configured for generating a switch signal for assigning the switches 322 to correspond to the first pressable portions 422 or to the second pressable portions 442 in response to user operation.

In the embodiment, as shown in FIGS. 3 and 4, the switch unit 100 includes a first conductive element 50, a second conductive element 52, a third conductive element 54, a fourth conductive element 56, and a fifth conductive element 58. At least portions of the elements 50, 52, 54, 56, and 58 are made of metal. The elements 50, 52, and 54 protrude out from a sidewall 326 of the recessed portion 32. The element 56 protrudes out from an inner sidewall 424 of the pressable member 40, and the element 58 protrudes out from another inner sidewall 426 of the pressable member 40. When the pressable member 40 is rotated until the surface 42 of the pressable member 40 is above the surface 324 of the recessed portion 32, the element 56 contacts with the element 50 and 52, and a switch signal for assigning the electronic switches 322 to correspond to the first pressable portions 422 is generated and transmitted to the processor 400. When the pressable member 40 is rotated until the surface 44 of the pressable member 40 is above the surface 324 of the recessed portion 32, the element 58 contacts with the elements 52 and 54, and a switch signal for assigning the electronic switches 322 to correspond to the second pressable portions 442 is generated and transmitted to the processor 400.

Figure 6:
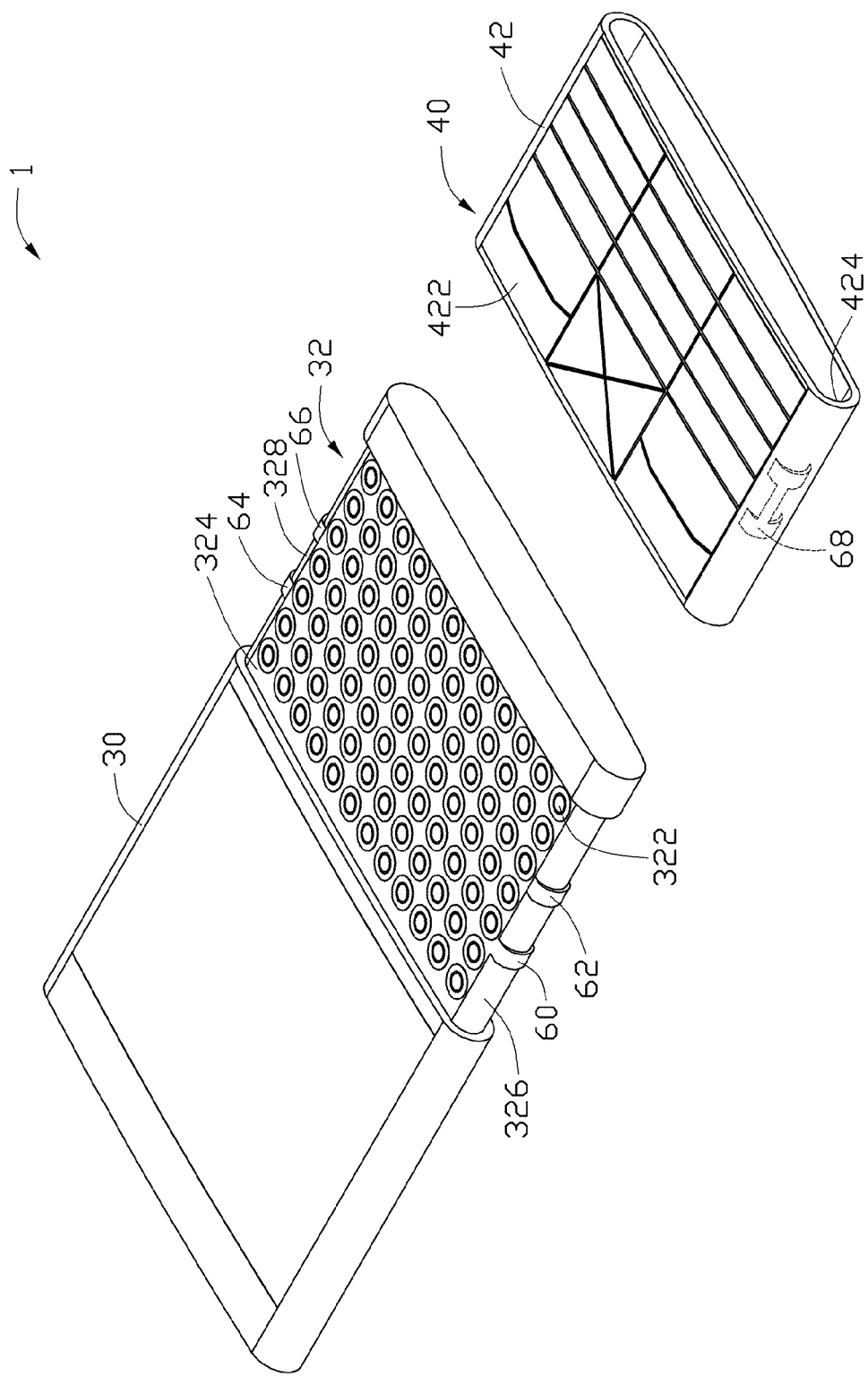
FIG. 6 is an exploded, perspective view of, slightly different from FIG. 4.

In an alternative embodiment, as shown in FIG. 6, the switch unit 100 includes a sixth element 60, a seventh element 62, an eighth element 64, a ninth element 66, and a tenth element 68. At least portions of the elements 60, 62, 64, 66, and 68 are made of metal. The elements 60 and 62 protrude out from the sidewall 326 of the recessed portion 32. The elements 64 and 66 protrude out from the sidewall 328 of the recessed portion 32. The element 68 protrudes out from the inner sidewall 424 of the pressable member 40. When the pressable member 40 is rotated until the surface 42 of the pressable member 40 is above the surface 324 of the recessed portion 32, the element 68 contacts with the elements 60 and 62, and a switch signal for assigning the electronic switches 322 to correspond to the second pressable portions 442 is generated and transmitted to the processor 400. When the pressable member 40 is rotated until the surface 44 of the pressable member 40 is above the surface 324 of the recessed portion 32, the element 68 contacts with the elements 64 and 66, and a switch signal for assigning the electronic switches 322 to correspond to the second pressable portions 442 is generated and transmitted to the processor 400.

The keypad circuit 200 is configured for generating key signals in response to the user pressing on the first keys 12 on the first keypad 10 or the second keys 22 on the second keypad 20. In the exemplary embodiment, when a switch 322 is pressed, the keypad circuit 200 generates a key signal and transmits the key signal to the processor 400.

The storage 300 is configured for storing a first relationship table defining relationships between ASCII codes of input of the first keys 12 and key signals generated by the circuit 200, and a second relationship table defining relationships between ASCII codes of input of the second keys 22 and key signals generated by the circuit 200.

The processor 400 is configured for assigning the switches 322 to correspond to the first pressable portions 422 or the second pressable portions 442 according to the switch signal generated by the switch unit 100. If the switches 322 are determined to correspond to the first pressable portions 422, the processor 400 determines which of the first keys 12 on the first keyboard 10 is pressed according to a key signal generated by the circuit 200 and the stored first relationship table. If the switches 322 are determined to correspond to the second keyboard 10, the processor 400 determines which of the second keys 22 on the first keyboard 20 is pressed according to a key signal generated by the circuit 200 and the stored first relationship table.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device with two keypads, comprising:
   a main body comprising a recessed portion, wherein a plurality of key switches is arranged on a surface of the recessed portion;
   a pressable member rotatably attached to the recessed portion, wherein the pressable member comprises a first surface and a second surface, a plurality of first pressable portions are formed on the first surface, and a plurality of second pressable portions are formed on the second surface; the first pressable portions and the key switches form the first keys, and the second pressable portions and the key switches form the second keys;
   a switch unit configured for generating a switch signal for assigning the key switches to correspond to the first pressable portions or the second pressable portions in response to user operation; and
   a processor configured for assigning the key switches to correspond to the first pressable portions or the second pressable portions according to the switch signal generated by the switch unit.

2. The electronic device as described in claim 1, further comprising a keypad circuit configured for generating key signals in response to the user pressing on the first keys or the second keys.

3. The electronic device as described in claim 2, wherein when a key switch is pressed, the keypad circuit generates a corresponding key signal.

4. The electronic device as described in claim 2, further comprising a storage configured for storing a first corresponding relationships between ASCII codes of input of the first pressable portions and key signals generated by the keypad circuit, and a second corresponding relationships between ASCII codes of input of the second pressable portions and key signals generated by the keypad circuit; and the processor is further configured for determining which key is pressed according to the switch signal and the first corresponding relationship or the second corresponding relationship.

5. The electronic device as described in claim 1, wherein the pressable member is made of soft material.

6. The electronic device as described in claim 1, wherein a first conductive element, a second conductive element, and a third conductive element protrude out from a sidewall of the recessed portion, and a fourth conductive element protrudes out from an inner sidewall of the pressable member, and a fifth conductive element protrudes out from another inner sidewall of the pressable member; when the fourth conductive element contacts with the first conductive element and the second conductive element, a switch signal for assigning the key switches to the first keys is generated and transmitted to the processor, and when the fifth conductive element contacts with the second conductive element and the third conductive element, a switch signal for assigning the key switches to the second keys is generated and transmitted to the processor.

7. The electronic device as described in claim 1, wherein a sixth conductive element and a seventh conductive element protrude out from a sidewall of the recessed portion, and an eighth conductive element and a ninth conductive element protrude out from another opposite sidewall of the recessed portion, and a tenth conductive element protrudes out from an inner sidewall of the pressable member; when the tenth conductive element contacts with the sixth conductive element and the seventh conductive element, a switch signal for assigning the key switches to correspond to the first pressable portions is generated and transmitted to the processor, and when the tenth conductive element contacts with the eighth conductive element and the ninth conductive element, a switch signal for assigning the key switches to the second pressable portions are generated and transmitted to the processor.

* * * * *